United States Patent [19]
Nakashima et al.

[11] Patent Number: 5,402,339
[45] Date of Patent: Mar. 28, 1995

[54] APPARATUS FOR MAKING MUSIC DATABASE AND RETRIEVAL APPARATUS FOR SUCH DATABASE

[75] Inventors: Kazuo Nakashima; Masahiro Nakada; Toshikatsu Narumi; Kazunori Naito, all of Kawasaki, Japan

[73] Assignee: Fujitsu Limited, Kawasaki, Japan

[21] Appl. No.: 127,510

[22] Filed: Sep. 28, 1993

[30] Foreign Application Priority Data

Sep. 29, 1992 [JP] Japan ................... 4-260079

[51] Int. Cl.⁶ .................................... G06F 15/40
[52] U.S. Cl. ..................................... 364/419.19
[58] Field of Search .............. 364/400, 419.19, 484, 364/485; 369/32, 48, 49; 84/601, 602, 609, 645, 641, 642, 470 R

[56] References Cited

U.S. PATENT DOCUMENTS

| | | | |
|---|---|---|---|
| 4,281,579 | 8/1981 | Bennett, Sr. ................. | 84/478 |
| 4,350,070 | 9/1982 | Bahu .......................... | 84/612 |
| 4,745,836 | 5/1988 | Dannenberg ................. | 84/610 |
| 4,843,562 | 6/1989 | Kenyon et al. .............. | 364/484 |
| 5,046,004 | 9/1991 | Tsumura et al. ............. | 84/601 |
| 5,210,820 | 5/1993 | Kenyon ....................... | 395/2 |
| 5,218,153 | 6/1993 | Minamitaka .................. | 84/613 |
| 5,243,582 | 9/1993 | Yamauchi et al. ........... | 369/32 |

*Primary Examiner*—Donald E. McElheny, Jr.
*Attorney, Agent, or Firm*—Armstrong, Westerman, Hattori, McLeland & Naughton

[57] ABSTRACT

An apparatus for making a musical database including a converting unit for converting musical information representing a music piece into note data items, each of note data items being a set of values associated with a period of a single sound denoted by a musical note and a scale level of the single sound denoted by the musical note, a position unit for producing position data items for the note data items, the position data items representing positions at which the note data items are positioned in the musical information, a unit for producing an index indicating relationships between the note data items and the position data items, and a storage unit for storing the index. A retrieval apparatus retrieves a string of note data items from a musical database using the index stored in the storage unit.

17 Claims, 9 Drawing Sheets

| POSITION | MUSICAL NOTE | NOTE DATA (AFTER CONVERTING) |
|---|---|---|
| "1" | SOUND"H"(ti) OF CROTCHET | (1, 7) |
| "2" | SOUND"F"(fa) OF MINIM | (2, 4) |
| "3" | SOUND"G"(sol) OF CROTCHET | (1, 5) |
| "4" | SOUND"H"(ti) OF CROTCHET | (1, 7) |
| "5" | SOUND"F"(fa) OF CROTCHET | (1, 4) |
| "6" | SOUND"H"(ti) OF CROTCHET | (1, 7) |
| "7" | SOUND"A"(la) OF CROTCHET | (1, 6) |
| "8" | SOUND"F"(fa) OF MINIM | (2, 4) |
| "9" | SOUND"F"(fa) OF CROTCHET | (1, 4) |
| "10" | SOUND"G"(sol) OF CROTCHET | (1, 5) |

FIG.3C

| NOTE DATA | FREQUENCY | POSITION |
|---|---|---|
| ( 1, 7 ) | 3 | 1, 4, 6 |
| ( 2, 4 ) | 2 | 2, 8, |
| ( 1, 5 ) | 2 | 3, 10, |
| ( 1, 4 ) | 2 | 5, 9, |
| ( 1, 6 ) | 1 | 7, |

| NOTE DATA ITEM AND NEXT ONE | FREQUENCY | POSITION |
|---|---|---|
| (1,7) (2,4) | 1 | 1 |
| (2,4) (1,5) | 1 | 2 |
| (1,5) (1,7) | 1 | 3 |
| (1,7) (1,4) | 1 | 4 |
| (1,4) (1,7) | 1 | 5 |
| (1,7) (1,6) | 1 | 6 |
| (1,6) (2,4) | 1 | 7 |
| (2,4) (1,4) | 1 | 8 |
| (1,4) (1,5) | 1 | 9 |

APPARATUS FOR MAKING MUSIC DATABASE AND RETRIEVAL APPARATUS FOR SUCH DATABASE

BACKGROUND OF THE INVENTION (1) Field of the Invention

The present invention relates to an apparatus for making a music database of musical information which can be processed by a computer and a retrieval apparatus for retrieving a string of note data items from the music database.

(2) Description of the Related Art

Due to developing computers, various types of information can be processed by computers. Document files including texts, documents and the like are typical information which can be processed by such computers. Due to recent increasing of the capacity of storage units, such as optical disk units, hard disk units and floppy disk units, databases of the above information have expanded. A retrieval system capable of easily retrieving information from a large-size database is developing.

In addition, such computers can also process other information such as musical information. In this case, musical performance information is stored with a file format in a storage unit, and the computer plays a music program in accordance with the musical performance information. Since the file format of the musical information is based on MIDI (Musical Instrument Digital Interface) which is an international standard, musical editing software conformable to the MIDI are rapidly gaining popularity, and the amount of musical information having the MIDI format is rapidly increasing. Thus, as to increasing of MIDI format musical information, it is desired that an apparatus capable of easily making a music database and a retrieval apparatus capable of easily retrieving a desired musical information are developed.

There is a case where it is necessary for a user to retrieve a string of musical notes (a phrase) from a music file in which musical information having the MIDI format is stored. To compose music or to arrange music with reference to phrases included in music previously composed by famous composers, the phrases may be retrieved from a music file in which musical information of music composed is stored. In this case, the phrases can be retrieved from the music file as follows. While strings of musical notes are being read out string by string from a music file from which a phrase is to be retrieved, the desired phrase is compared with the strings of musical notes string by string. It is then determined whether or not the phrase is equal to each of the strings of musical notes.

In the above retrieval method, since the phrase must be compared with strings of musical notes read out from the music file string by string, a long retrieving time is required to retrieve the phrase from the large-size music file. In addition, it is possible that it is desired to retrieve a phrase from a music file with reference to an index including strings of musical notes which have previously been selected from the music file as retrieval keys. However, it is difficult to select, with a high probability, strings of musical notes which can be retrieval keys.

That is, there is, conventionally, no retrieval apparatus capable of easily retrieving a phrase from a music file. Thus, it is difficult for a beginner to compose and to arrange music.

SUMMARY OF THE INVENTION

Accordingly, a general object of the present invention is to provide a novel and useful apparatus for making a music database and a retrieval apparatus for the music database in which the disadvantages of the aforementioned prior art are eliminated.

A more specific object of the present invention is to provide an apparatus capable of making a music database from which strings of musical notes can be easily retrieved.

The above objects of the present invention are achieved by an apparatus for making a musical database comprising: converting means for converting musical information representing a music piece into note data items, each of note data items being a set of values of a period of a single sound denoted by a musical note and a scale level of the single sound denoted by the musical note; position making means for making position data items for the note data items, the position data items representing positions at which the note data items are positioned in the musical information; means, coupled to said converting means and said position making means, for making a first index indicating relationships between the note data items and the position data items; and storage means, coupled to said means for making the index, for storing the first index.

Another object of the present invention is to provide a retrieval apparatus capable of retrieving strings of musical notes from a music database.

The above objects of the present invention are achieved by a retrieval apparatus for retrieving a string of note data items representing musical notes from a musical database, said retrieval apparatus comprising: storage means for storing an index indicating relationships between note data items representing a music piece in the musical database and position data items representing positions at which the note data items are positioned in the music piece; input means for inputting a string of note data items which are to be retrieved from the musical database; first retrieval means, coupled to said storage means and said input means, for selecting, from the note data items in the index stored in said storage means, a note data item equal to one of the note data items of the string input by said input means; second retrieval means, coupled to said first retrieval means, for selecting a note data item next to the note data item selected by said first retrieval means with reference to the index; and determination means, coupled to said second retrieval means, for determining whether or not the note data item selected by said second retrieval means is equal to a note data item next to the one of the note data items in the string input by said input means, so that the string of note data items is retrieved using a determination result obtained by said determination means.

According to the present invention, an index indicating relationships between note data items representing music and position data items representing positions at which the note data items are positioned in the music is automatically produced. Thus, the musical database including music and the index can be easily made. In addition, as the index indicating the relationships between the note data items and the position data items is used in a retrieving process, a string of note data items can be rapidly retrieved from the musical database.

Additional objects, features and advantages of the present invention will become apparent from the fol-

DESCRIPTION OF THE PREFERRED EMBODIMENT

A description will now be given, with reference to FIG. 1A, of the principle of an apparatus for making a music database according to the present invention.

Figures 1A, 1B:
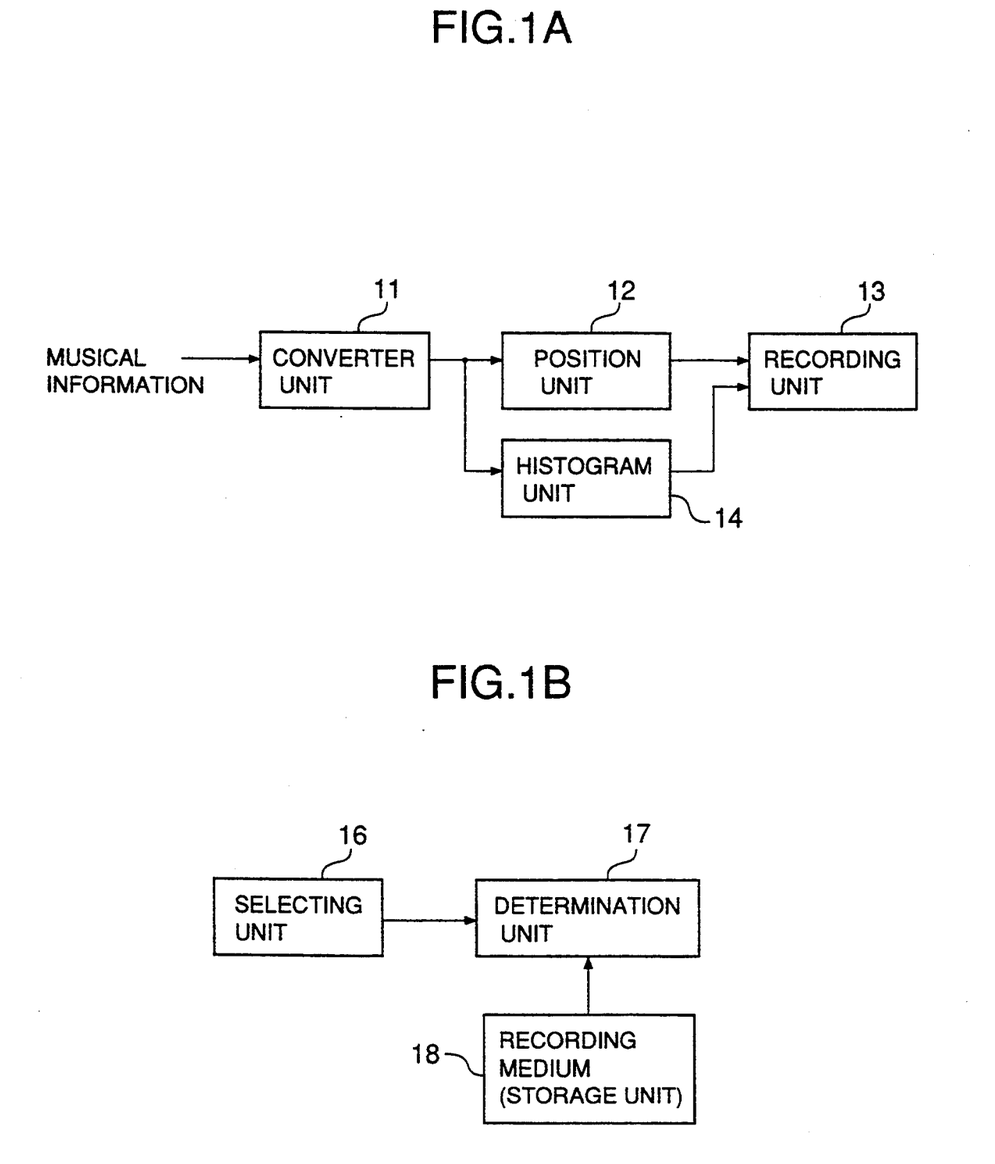
FIG. 1A is a block diagram illustrating the principle of an apparatus for making a musical database.
FIG. 1B is a block diagram illustrating the principle of a retrieval apparatus for the musical database.

Referring to FIG. 1A, an apparatus has a converter unit 11, a position information unit 12 and a recording unit 13. Musical information representing a music piece is supplied from an external unit (e.g. a computer system, an electrical musical instrument, a music sampler or a reproducing device) to the converter unit 11. The converter unit 11 converts the musical information into note data items each representing period and scale level of a single sound identified by a musical note, both of which have digital values. The position information unit 12 produces position data items identifying positions at which the note data items appear in the musical information. The recording unit 13 records the note data items and corresponding position data items in a storage unit (a recording medium) so that an index of the note data and the position data is made in the storage unit.

The apparatus for making a music database also has a histogram unit 14. The histogram unit 14 makes a histogram indicating a frequency with which a musical note identified by each note data item occurs in the music represented by the musical information. The histogram is written into the storage unit by the recording unit 13.

A description will now be given, with reference to FIG. 1B, of a retrieval apparatus for the music database according to the present invention.

Referring to FIG. 1B, a retrieval apparatus has a selecting unit 16, a determination unit 17 and a storage unit 18. The selecting unit 16 is operated, for example, by a user, and inputs a string of note data items which is selected as a retrieval key. The index made by the recording unit 13 and the histogram made by the histogram unit 14 are stored in the storage unit 18. The determination unit 17 determines whether or not the string of note data items supplied from the selecting unit 16 exists in the musical information with reference to the index and/or the histogram stored in the storage unit 18. The determination unit 17 outputs a retrieval result corresponding to a determination result.

A description will now be given of a first embodiment of the present invention.

Figure 2:
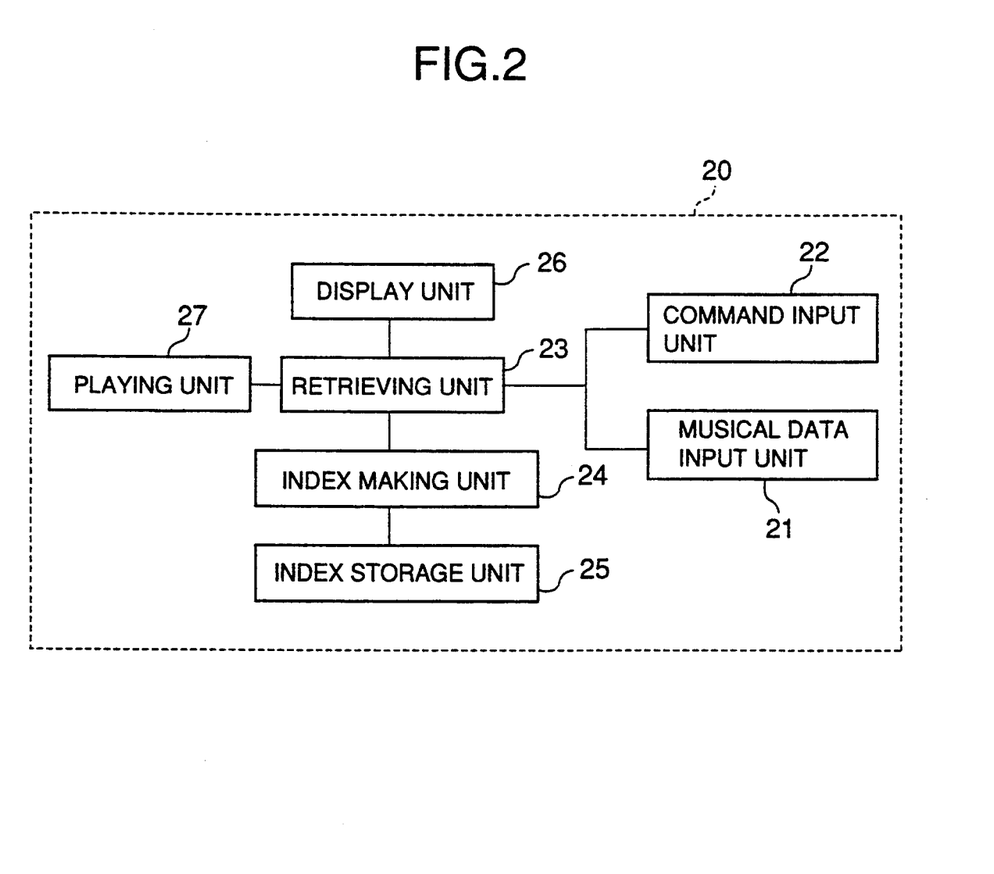
FIG. 2 is a block diagram illustrating a musical database making/retrieval apparatus according to a first embodiment of the present invention.

FIG. 2 shows a music database making/retrieval apparatus 20. Referring to FIG. 2, the music database making/retrieval apparatus 20 has a musical data input unit 21, a command input unit 22, a retrieving unit 23, an index making unit 24, a index storage unit 25, all of which are formed in a computer system. The music database making/retrieval apparatus 20 also has a display unit 26 and a playing unit 27. The musical data input unit 21 corresponds to the converter unit 11 shown in FIG. 1A, and converts musical information representing a music piece into note data items identifying musical notes. Each note data item represents a period and a scale level of a single sound identified by a musical note, such a data item having digital values. The note data item may represent a reset (no sound) in a music. Each note data item represents the period of a single sound of a musical note, for example, as follows. That is, the period of a single sound of a crotchet (quarter) is denoted by "1", the period of a single sound of a minim (eighth) is denoted by "2"; other musical notes (and rests) are denoted in the same manner. In addition, each note data item represents the scale level(e,g, the sol-fa) of a single sound identified by a musical note, for example, as follows. A sound "C" (do) is denoted by "1", a sound "D" (re) is denoted by "2", a sound "E" (mi) is denoted by "3", a sound "F" (fa) is denoted by "4", a sound "G" (sol) is denoted by "5", a sound "A" (la) is denoted by "6" and a sound "H" (ti) is denoted by "7". A reset is denoted by "0". Thus, each note data item is denoted by a set (a,b) of two values "a" and "b", where the value "a" indicates the period of a single sound identified by a musical note and the value "b" indicates the scale level of the single sound.

Figure 3A:
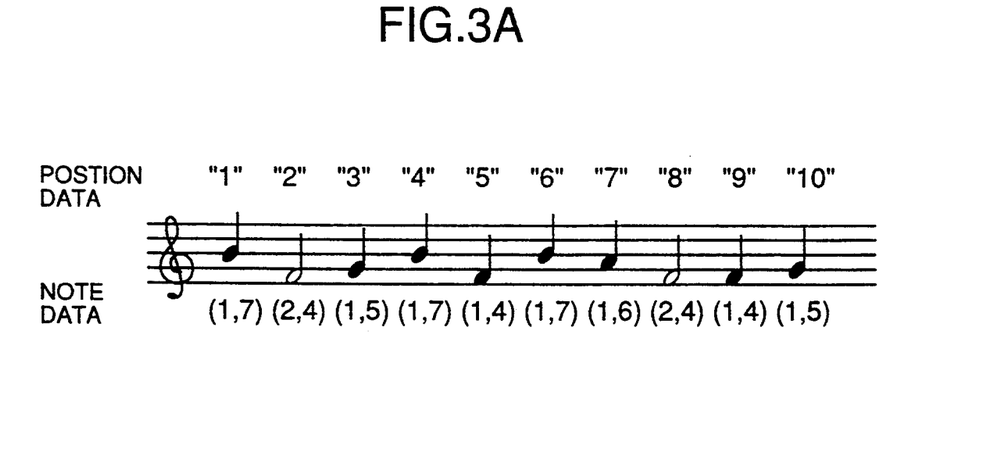
FIG. 3A is a diagram illustrating an example of musical information, note data items and position data.

The musical information indicated by a score shown in FIG. 3A is converted, by the musical data input unit 21, into note data items corresponding to musical notes in the score as indicated as sets of values under the musical notes.

The command input unit 22 corresponds to the selecting unit 16 shown in FIG. 1A. A string of note data items to be retrieved, various commands and other information are input from the command input unit 22. The retrieval unit 23 relays note data items from the musical data input unit 21 to the index making unit 24, and retrieves strings of note data items equal to the string of note data items input from the command input unit 22 with reference to the index stored in the index storage unit 25. The retrieval unit 23 corresponds to the determination unit 17 shown in FIG. 1A.

The index making unit 25 corresponds to the position unit 12 and the histogram unit 14 shown in FIG. 1A. The index making unit 25 makes position data and a histogram and makes indexes using the note data items representing the musical information (corresponding to a music piece) and the position data and histogram. The position data indicates positions at which each of the note data items is positioned in the musical information and has a digital value, the histogram indicating a frequency with which each of the note data items occurs in the musical information.

The index storage unit 25 corresponding to the recording medium in the recording unit 13 is shown in FIG. 1A. The index storage unit 25 is constituted by a storage device, such as a floppy disk device, an optical disk device or a hard disk device and the index made by the index making unit 24 is stored in the storage unit 25. The display unit 26 displays strings of note data items to be retrieved from musical information included in a musical database. The playing unit 26 has a loud speaker and plays music in accordance with musical information made using strings of note data items retrieved from the musical database and/or in accordance with musical information in the musical data base.

The above music database making/retrieval apparatus is operated as follows.

Figure 3B:
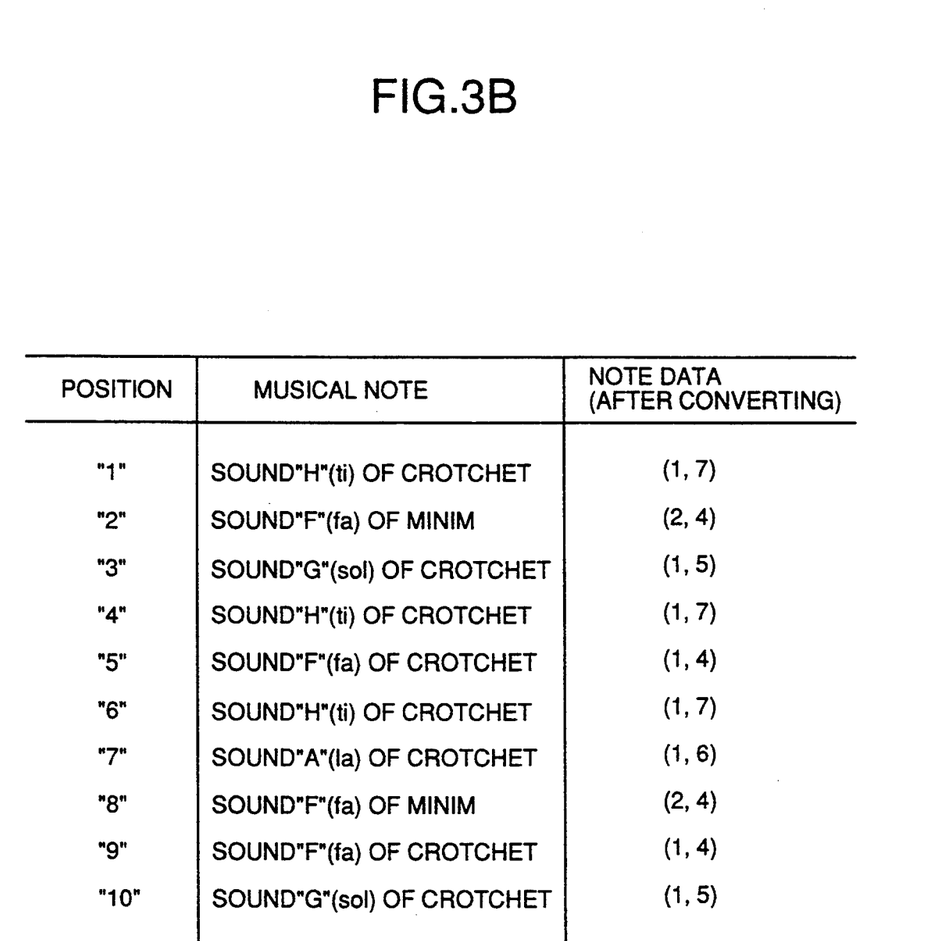
FIG. 3B and FIG. 3C are tables illustrating indexes made by an index making unit.
Figure 3C:
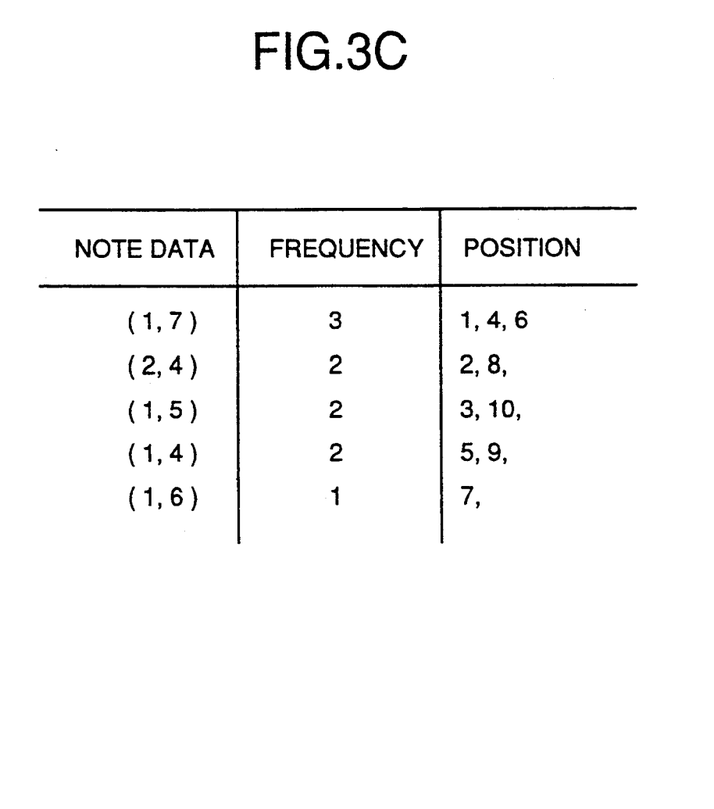

First, musical information is added to a musical database as follows. When musical information corresponding to music shown in FIG. 3A is supplied to the music data input unit 21, note data items (1,7), (2,4), (1,5), . . . and (1,5) into which the musical information is converted by the musical data input unit 21 are supplied to the index making unit 24 via the retrieval unit 23. The index unit 23 respectively assigns position data items "1", "2", "3" . . . and "10" to a note data item (1,7) identifying a sound "H" (ti) of a crotchet, a note data item (2,4) identifying a sound "F" (fa) of a minim, a note data item (1,5) identifying a sound "G" (sol) of a crotchet, . . . and a note data item (1,5) identifying a sound "G" (sol) of a crochet, so that an index indicating relationships between the position data items and the note data items is made as shown in FIG. 3B. Further, the index making unit 24 computes a frequency in which each of the note data items occurs in the musical information. A note data item (1,7) is positioned at positions "1", "4" and "6 in the musical information, a note data item (2,4) is positioned at positions "2" and "8" in the musical information, a note data item (1,5) is positioned at positions "3" and "10" in the musical information, a note data item (1,4) is positioned at positions "5" and "9" in the musical information, and a note data item (1,6) is positioned at a position "7" in the musical information. Thus, the index making unit 24 makes an index indicating a histogram as shown in FIG. 3C. The indexes made by the index making unit 24 as shown in FIGS. 3B and 3C are stored in the index storage unit 25. That is, the indexes indicating a structure of the musical information are added in an index file, and the musical information is added to the musical database stored in the storage unit.

Second, a retrieval operation is carried out as follows.

Figure 4:
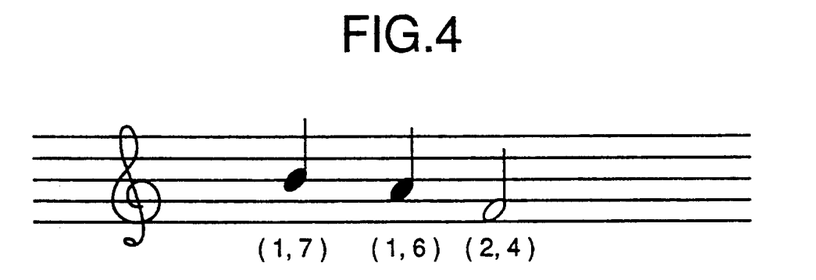
FIG. 4 is a diagram illustrating a string of note data items to be retrieved.
Figure 5:
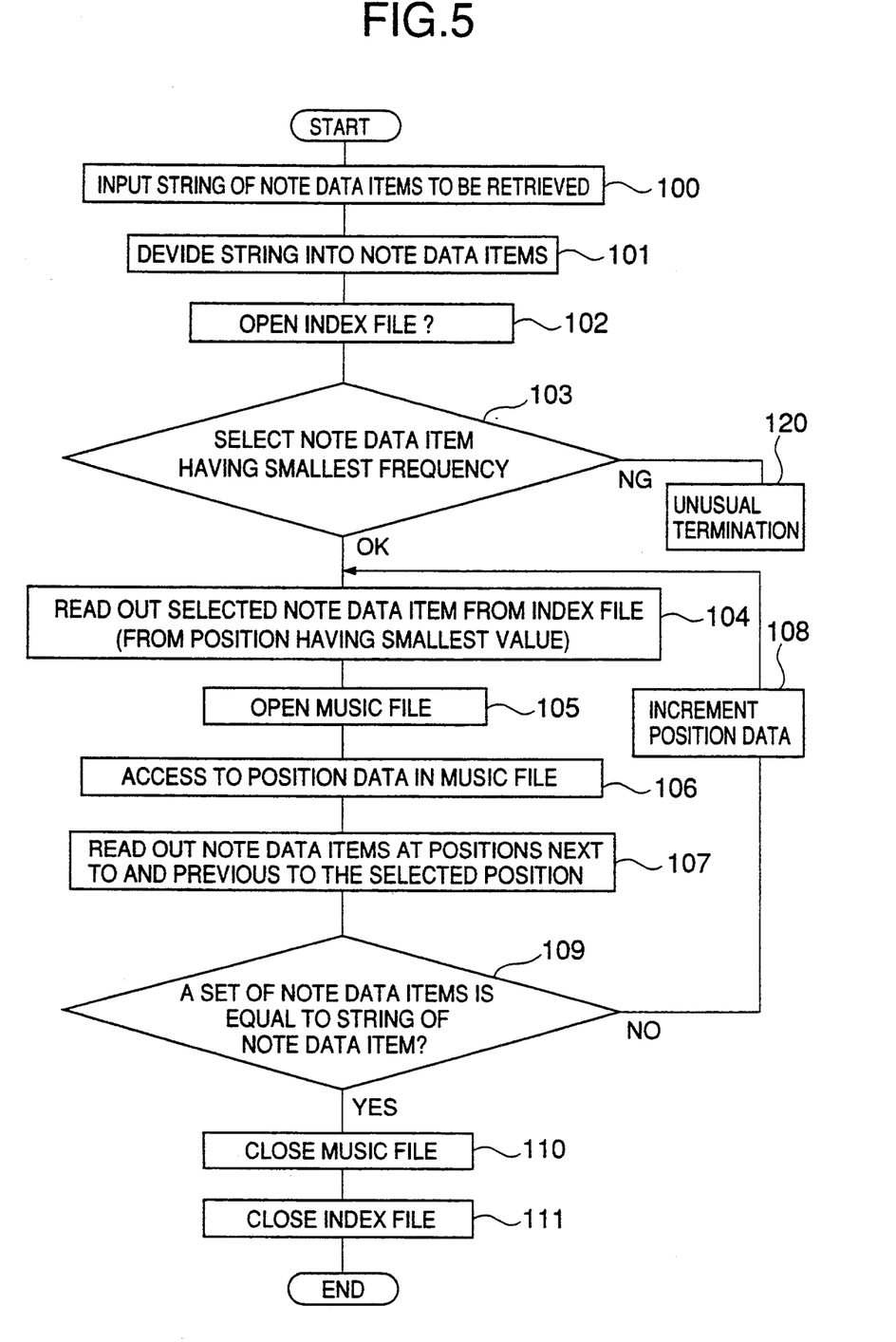
FIG. 5 is a flow chart illustrating a retrieval process carried out by a retrieval unit.

When a string of note data items (1,7), (1,6) and (2,4), as shown in FIG. 4, to be retrieved is input from the command input unit 22, the note data items (1,7), (1,6) and (2,4) are supplied to the retrieval unit 23. The retrieval unit 23 carries out a retrieval process in accordance with a flow chart shown in FIG. 5. Referring to FIG. 5, after inputting the string of note data items (1,7), (1,6) and (2,4) in step 100, the retrieval unit 23 divides the string into respective note data items (1,7), (1,6) and (2,4) in step 101. The index file is then opened in step 102. After this, in step 103, a note data item having the smallest frequency of occurrence is selected from among the note data items (1,7), (1,6) and (2,4) with reference to the index indicating the histogram shown in FIG. 3C. As a result, the note data item (1,6) is selected. The retrieval unit 23 reads out a position data item "7" corresponding to the selected note data item (1,6) from the index shown in FIG. 3B in step 104. If a frequency of occurrence of the selected note data item is greater than 2, a position data item having the smallest value is read out from the index in step 104. After the position data item corresponding to the selected note data item is read out from the index, the musical database (a music file) including the musical information is opened in step 105. The retrieval unit 23 then accesses a position identified by the position data item "7" in the musical information in step 107. Note data items at positions immediately previous to and immediately following the position identified by the position data item used in step 106 are read out from the musical information. In this case, the note data items (1,7) and (2,4) positioned at positions identified by the position data items "6" and "8" are read out from the musical information. After this, it is determined, in step 109, whether or not a set of the note data items read out in steps 104 and 107 is equal to the string of note data items input from the musical data input unit 21. If it is determined, in step 109, that the set of note data items is not equal to the string of note data, the position data item is incremented by one in an order indicated in the index shown in FIG. 3A, in step 108. The above process in steps 104, 105, 106, 107,108 and 109 is repeatedly carried out. In this embodiment, the set of note data items (1,7), (1,6) and (2,4) is equal to the string of note data items which is to be retrieved, so that after the musical database and the index file are closed in steps 110 and 111, the retrieval process is terminated. As a result, the set of note data items (1,7), (1,6) and (2,4) and corresponding position data "6", "7" and "8" are displayed, as retrieval results, on the display unit 26.

If a note data item is not selected in step 103, an unusual termination process is executed in step 120 so that, for example, an alarm message is displayed on the display unit 26 and/or an alarm sound is output from the play unit 27. In addition, if there is no set of note data items equal to the string of note data items to be retrieved (see steps 104, 105, 106, 107,108 and 109), the retrieval process is interrupted.

According to the first embodiment, the musical database including the index file and the music file is automatically made. In addition, as the string of note data items are retrieved from the music data using a note data item selected from the string and having the smallest frequency of occurrence, the string of note data items can be rapidly retrieved from the musical information.

Figure 6:
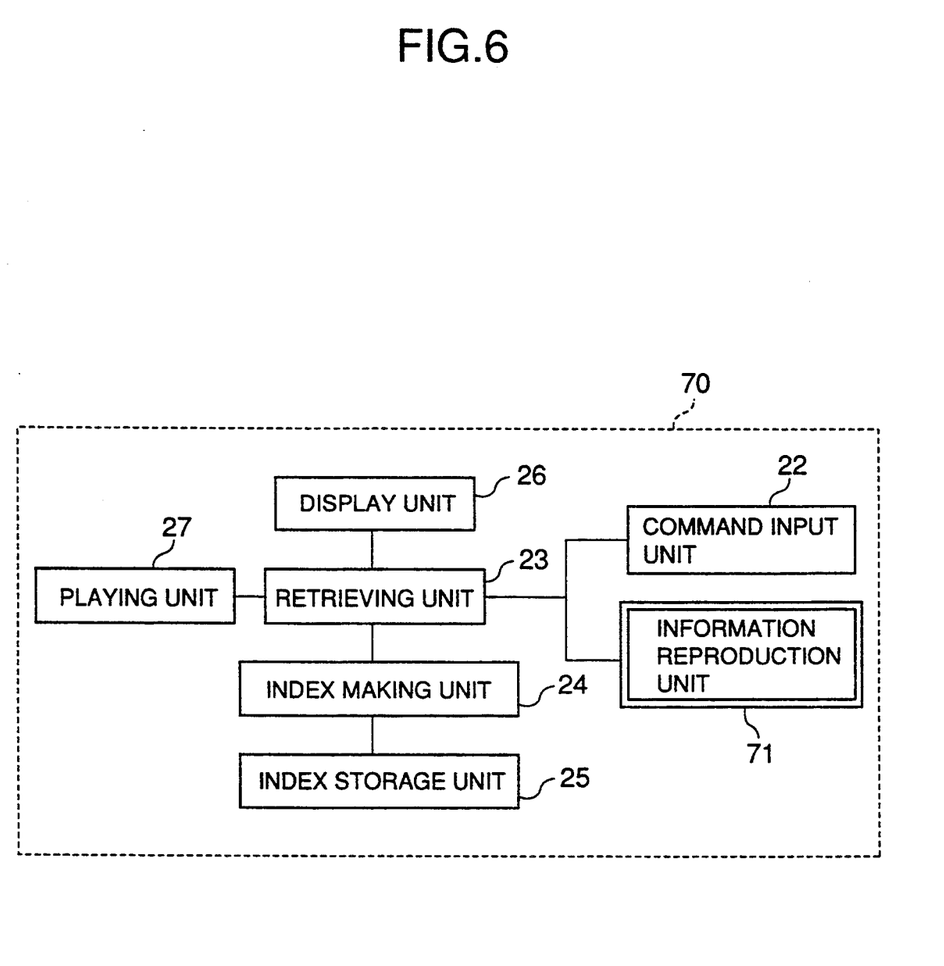
FIG. 6 is a block diagram illustrating a musical database making/retrieval apparatus according to a second embodiment of the present invention.

A description will now be given, with reference to FIG. 6, of a second embodiment of the present invention. In FIG. 6, those parts which are the same as those shown in FIG. 2 are given the same reference numbers.

Referring to FIG. 6, the musical database making/retrieval apparatus 70 has an information reproduction unit 71 instead of the musical data input unit 21. The information reproduction unit 71 corresponds to the converter 11 shown in FIG. 1A. The information reproduction unit 71 reproduces musical information having the MIDI format from a storage medium such as a floppy disk, an optical disk or the like, and converts the reproduced musical information into note data items. The information reproduction unit 71 may directly reproduce note data items into which the musical information is converted. The note data items output from the information reproduction unit 71 is supplied to the index forming unit 24 via the retrieval unit 23 in the same manner as those in the first embodiment.

According to the second embodiment, musical information stored in an exchangeable storage medium such as a floppy disk or an optical disk can be easily added to the musical data base.

Figure 7:
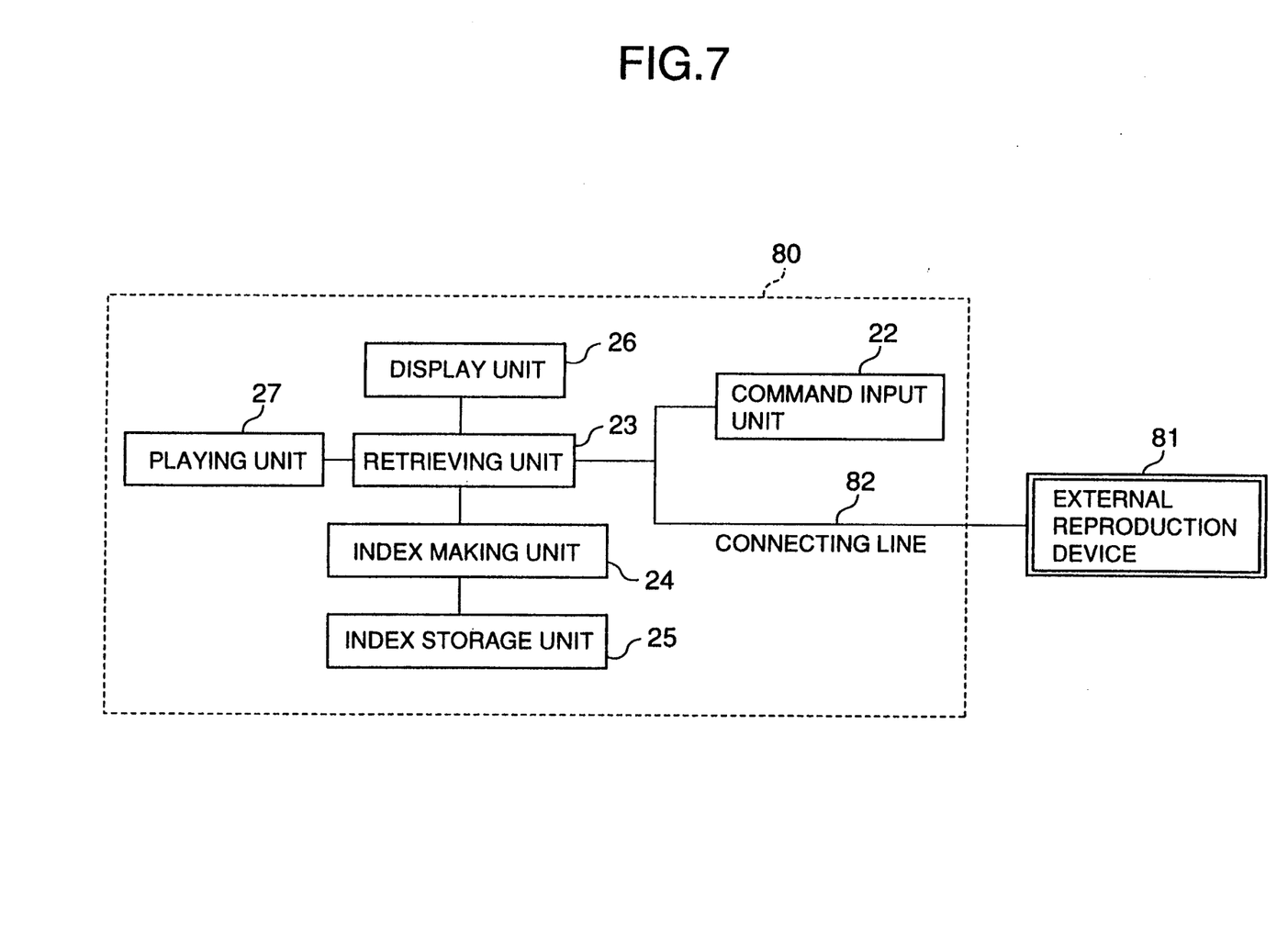
FIG. 7 is a block diagram illustrating a musical database making/retrieval apparatus according to a third embodiment of the present invention.

A musical database making/retrieval apparatus according to a third embodiment of the present invention is shown in FIG. 7. In FIG. 7, those parts which are the same as those shown in FIG. 2 are given the same reference numbers.

Referring to FIG. 7, an external information reproduction device 81 substituted for the musical data input unit 21 shown in FIG. 2 is provided outside of a musical data base making/retrieval apparatus 80. The external information reproduction device 81 can be connected to the retrieval unit 23 of the musical database making/retrieval apparatus 80 via a connecting line 82. Note data items into which musical information is converted are reproduced by the external information reproduction device 81. The note data items are supplied from the external information reproduction device 81 to the index making unit 24 via the connecting line 82 and the retrieval unit 23.

According to the third embodiment, the musical information stored in an external storage device (the external information reproduction device 81) can be added to the database.

Figure 8:
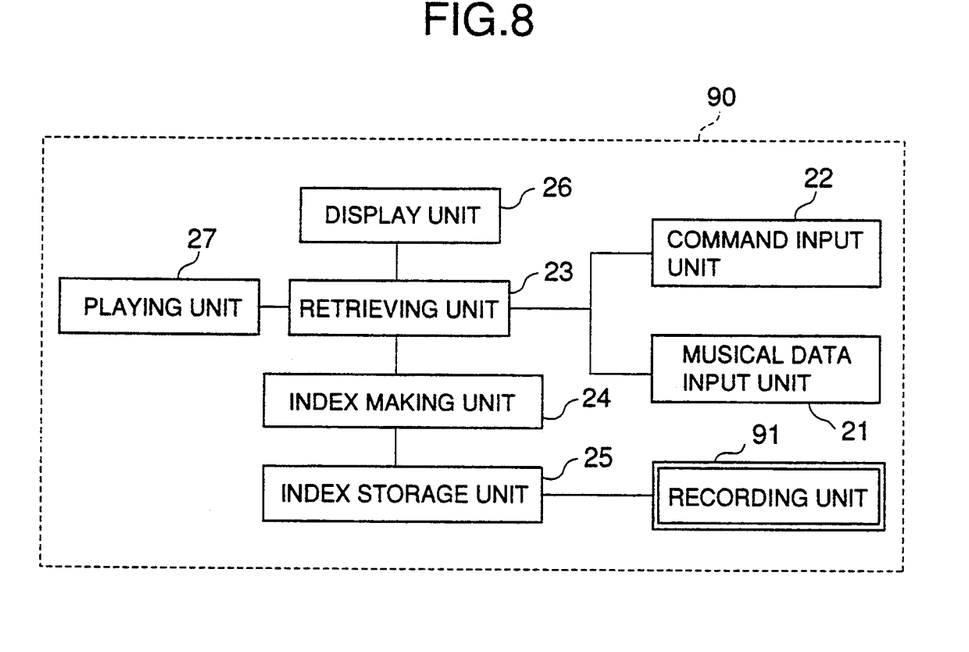
FIG. 8 is a block diagram illustrating a musical database making/retrieval apparatus according to a fourth embodiment of the present invention.

A musical database making/retrieval apparatus according to a fourth embodiment of the present invention is shown in FIG. 8. In FIG. 8, those parts which are the same as those shown in FIG. 2 are given the same reference numbers.

Referring to FIG. 8, the musical database making/retrieval apparatus 90 is mounted with an information recording unit 91 connected to the index storage unit 25. The information recording unit 91 has an exchangeable recording medium such as a floppy disk or an optical disk. The index file stored in the index storage unit 25 is moved to the recording medium in the information recording unit 91 and the index file is maintained in the recording medium.

According to the fourth embodiment, the index file can be kept in the recording medium such as a floppy disk, an optical disk or the like. Thus, the musical database making/retrieval apparatus can have a large-size index file.

Figure 9:
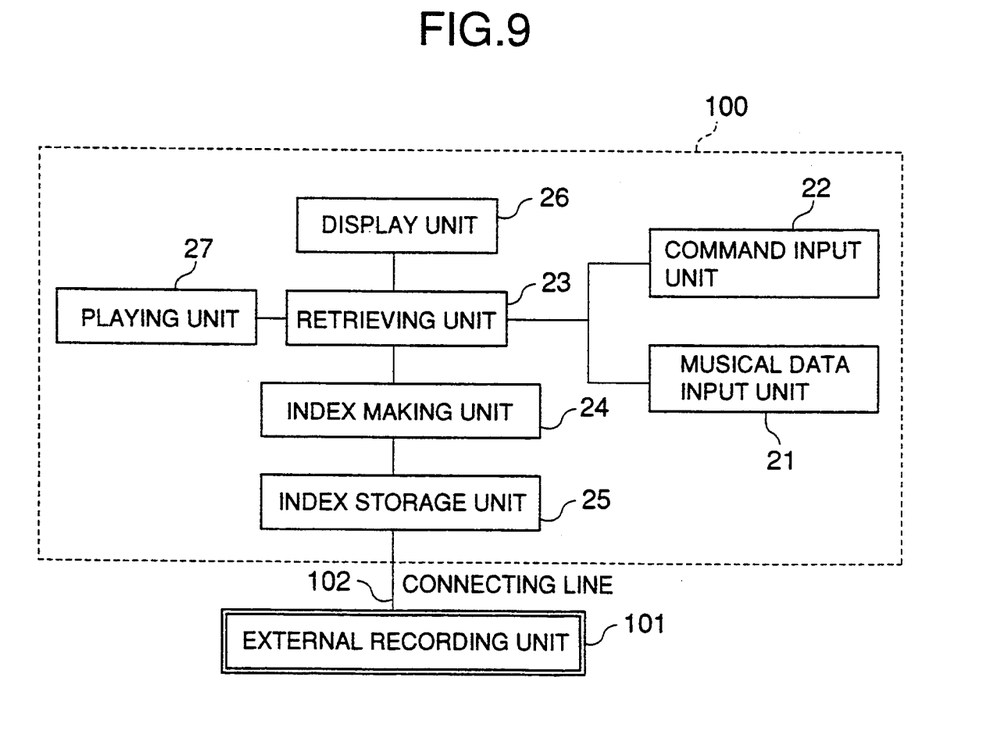
FIG. 9 is a block diagram illustrating a musical database making/retrieval apparatus according to a fifth embodiment of the present invention.

A musical database making/retrieval apparatus according to a fifth embodiment of the present invention is shown in FIG. 9. In FIG. 9, those parts which are the same as those shown in FIG. 2 are given the same reference numbers.

Referring to FIG. 9, an external recording device 101 is connected to the index storage unit 25 of the musical database making/retrieval apparatus 100 via a connecting line 102. The external recording device 101 has a recording medium such as a hard disk, a magneto-optic disk. The index file including the indexes shown in FIGS. 3B and 3C can be moved to the recording medium in the external recording device 101.

According to the fifth embodiment, the index file can be stored in various types of recording mediums in the external recording device 101. Thus, the musical database can be easily managed in an external system.

Figure 10:
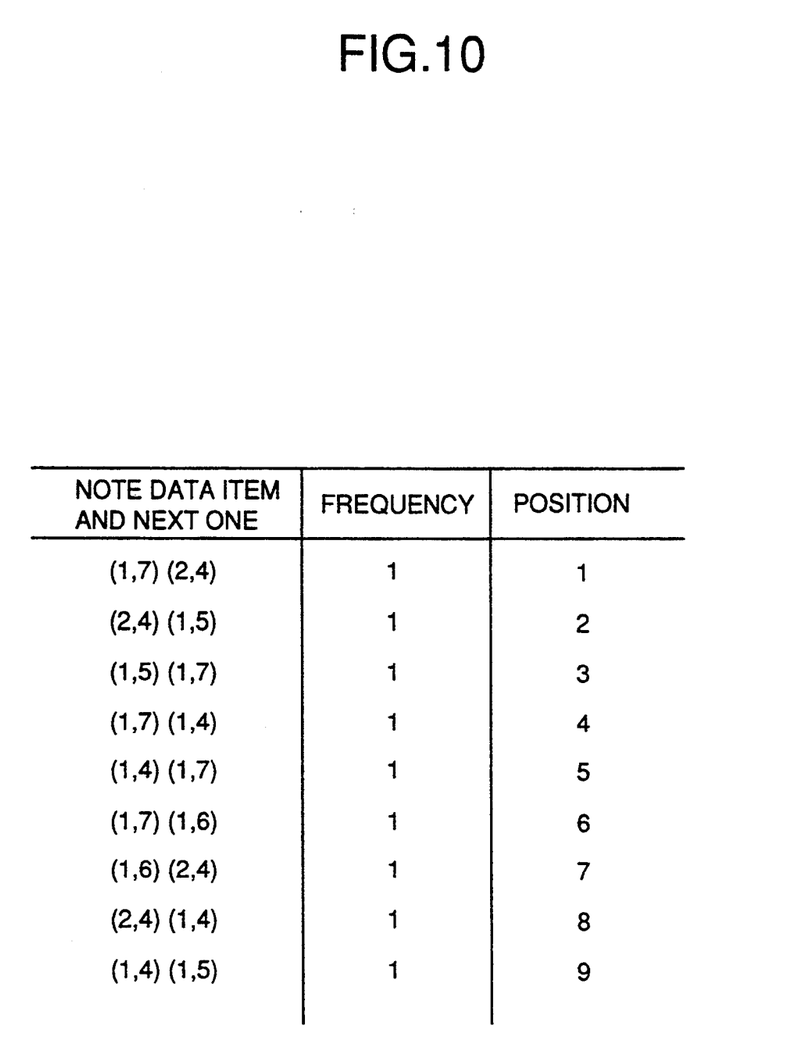
FIG. 10 is a table illustrating another embodiment of the index made by the index making unit.

The index making unit 24 may make an index indicating a position of each set of a plurality of note data items. For example, when musical information as shown in FIG. 3A is input to the apparatus, an index indicating a position of each set of two note data items and a frequency with which each set of two note data items occurs in the musical information may be made as shown in FIG. 10. In the index shown in FIG. 10, a frequency of occurrence of each set of two note data items is less than a frequency of occurrence of each note data item shown in FIG. 3C. Thus, in a case where the retrieving process is carried out using the index shown in FIG. 10, a string of note data items can be effectively retrieved from the musical database.

The index making unit 24 may make only an index indicating relationship between note data items and position data items. In this case, the retrieval unit 23 detects a position data item corresponding to a note data item selected from among note data items to be retrieved, other note data items to be retrieved are retrieved using the detected position data item.

The present invention is not limited to the aforementioned embodiments, and variations and modifications may be made without departing from the scope of the claimed invention.

What is claimed is:

1. An apparatus for making a musical database comprising:

converting means for converting musical information representing a music piece into note data items, each of note data items being a set of values associated with a period of a single sound denoted by a musical note and a scale level of the single sound denoted by the musical note;

position making means for producing position data items for the note data items, the position data items representing positions at which the note data items are positioned in the musical information;

first index forming means, coupled to said converting means and said position making means, for producing a first index indicating relationships between the note data items and the position data items; and storage means, coupled to said first index forming means for storing the first index.

2. The apparatus as claimed in claim 1, further comprising:

histogram producing means for making a histogram indicating frequencies in which the note data items occur in the musical information, the histogram being stored as a second index in said storage means.

3. The apparatus as claimed in claim 1, wherein said position producing means makes position data items, each of the position data items representing a position at which a set of a plurality of note data items are continuously arranged in the musical information.

4. The apparatus as claimed in claim 1, wherein said converting means has information reproduction means for reproducing the musical information, said information reproduction means outputting the note data items into which the musical information is converted when reproducing the musical information.

5. A retrieval apparatus for retrieving a string of note data items representing musical notes from a musical database, said retrieval apparatus comprising:

storage means for storing an index indicating relationships between note data items representing a music piece in the musical database and position data items representing positions at which the note data items are positioned in the music piece;

input means for inputting a string of note data items to be retrieved from the musical database;.

first retrieval means, coupled to said storage means and said input means, for selecting, from the note data items in the index stored in said storage means, a note data item equal to one of the note data items of the string input by said input means;

second retrieval means, coupled to said first retrieval means, for selecting a note data item immediately following the note data item selected by said first retrieval means with reference to the index; and determination means, coupled to said second retrieval means, for determining whether or not the note data item selected by said second retrieval means is equal to a note data item immediately following the one of the note data items in the string input by said input means, so that the string of note data items is retrieved using a determination result obtained by said determination means.

6. A retrieval apparatus for retrieving a string of note data items representing musical notes from a musical data base, said retrieval apparatus comprising:

storage means for storing a first index and a second index, the first index indicating relationships between note data items representing a music piece in the musical database and position data items representing positions at which the note data items are positioned in the music piece, the second index being a histogram indicating a frequency with which each of the noted data items occurs in the music piece;

input means for inputting a string of note data items to be retrieved from the musical database;

selecting means, coupled to said storage means and said input means, for selecting, with reference to the second index in said storage means, a note data item having a smallest frequency of occurrence from among the note data item in the string input by said input means;

first retrieval means, coupled to said storage means and said selecting means, for selecting, from the note data items in the first index stored in said storage unit, a note data item equal to the note data item selected by said selecting means;

second retrieval means, coupled to said first retrieval means, for selecting a note data item immediately following the note data item selected by said first retrieval means with reference to the first index; and determination means, coupled to said second retrieval means, for determining whether or not the note data item selected by said second retrieval means is equal to a note data item immediately following the note data item selected by said selecting means in the string input by said input means, so that the string of note data items is retrieved using a determination result obtained by said determination means.

7. A retrieval apparatus for retrieving a string of note data items representing musical notes form a musical database, said retrieval apparatus comprising:

storage means for storing an index indicating relationships between sets of a plurality of note data items continuously arranged in musical data representing a music piece and position data items representing positions at which the sets of the plurality of note data items are positioned in the musical information;

input means for inputting a string of note data items to be retrieved from the musical database;

determination means, coupled to said storage means and said input means, for determining whether or not the note data items of the string input by said input means exist in the music information by comparing the string of note data items with the sets of the plurality of note data items in the index, so that the string of note data items is retrieved using a determination result obtained by said determination means.

8. The retrieval apparatus as claimed in claim 7, wherein said index includes a histogram indicating frequencies with which the sets of the plurality of note data items occur in the musical information.

9. A method for making a musical database, comprising the steps of:

converting musical information representing a music piece into note data items representing musical notes, each of said note data items consisting of a set of values associated with both a period of a single sound denoted by a musical note and a scale level representing a pitch of the single sound denoted by the musical note;

producing position data items for the note data items, the position data items representing positions at which the note data items are positioned in the musical information;

producing a first index from the note data items and the position data items representing relationships between the note data items and the position data items; and storing the first index.

10. The method as recited in claim 9, further comprising the steps of:

producing a histogram as a second index indicating frequencies in which each of the note data items occurs in the musical information; and storing the second index.

11. The method as recited in claim 9, wherein said converting step includes the steps of:

reproducing the musical information; and outputting the note data items into which the musical information is converted.

12. A method for retrieving a string of note data items representing musical notes from a musical database, comprising the steps of:

storing an index indicating relationship between note data items representing a music piece in the musical database and position data items representing positions at which the note data items are positioned in the music piece;

inputting a string of note data items to be retrieved from the musical database;

selecting from the note data items in the stored index a first note data item equal to one of the inputted string of note data items;

selecting a second note data item immediately following the first note data item with reference to the index; and determining whether or not the second note data item is equal to a note data item immediately following the one of the inputted string of note data items, so that the string of note data items is retrieved using a determination result obtained by the determination means.

13. The method of claim 12, wherein the index consists of a first index indicating relationship between note data items representing a music piece in the musical database and position data items representing positions at which the note data items are positioned in the music piece, the second index being a histogram indicating a frequency with which each of the noted data items occurs in the music piece.

14. A method for retrieving a string of note data items representing musical notes from a musical database, comprising the steps of:

storing an index indicating relationship between sets of a plurality of note data items continuously arranged as musical data representing a musical piece and position data items representing positions at which the sets of the plurality of note data items are positioned in the musical information;

inputting a string of note data items to be retrieved from the musical database; and determining whether or not the inputted string of note data items exist in the music information by comparing the string of note data items with the sets of the plurality of note data items in the index, so that the string of note data items is retrieved.

15. The method of claim 14, wherein the index includes a histogram indicating frequencies with which the sets of the plurality of note data items occur in the musical information.

16. The method as claimed in claim 13, wherein the first data item having a small frequency of occurrence in the music piece is selected preferentially from the second index.

17. The method as claimed in claim 15, wherein the sets of the plurality of note data items in the index are compared with the string of note data items in an order increasing from a minimum frequency of occurrence in the musical information.

* * * * *